(12) United States Patent
Adkins

(10) Patent No.: US 6,382,745 B1
(45) Date of Patent: May 7, 2002

(54) LAPTOP WORKSTATION

(76) Inventor: Avis V. Adkins, P.O. Box 221, Hollister, FL (US) 32147

( * ) Notice: Subject to any disclaimer, the term of this patent is extended or adjusted under 35 U.S.C. 154(b) by 0 days.

(21) Appl. No.: 09/658,602

(22) Filed: Sep. 8, 2000

(51) Int. Cl.[7] ............................................... A47B 17/03
(52) U.S. Cl. ................. 312/223.3; 312/281; 248/441.1; 108/97
(58) Field of Search .................... 312/317.19, 317.3, 312/281, 223.3; 108/92, 94, 97, 44, 106, 147.19, 147.18, 147.21; 248/441.1, 451, 453; 297/188.01, 188.2, 174

(56) References Cited

U.S. PATENT DOCUMENTS

| | | |
|---|---|---|
| 3,922,973 A | 12/1975 | Sturgeon |
| 4,909,159 A | 3/1990 | Gonsoulin |
| 4,946,120 A | 8/1990 | Hatcher |
| 5,562,049 A * | 10/1996 | Hoffman et al. ............... 108/94 |
| 5,598,786 A | 2/1997 | Batterson |
| 5,673,628 A | 10/1997 | Boos |
| 5,803,326 A * | 9/1998 | Krieger et al. ............ 108/44 X |
| 5,857,654 A * | 1/1999 | Berman .................... 248/441.1 |
| 5,951,128 A | 9/1999 | Aidone et al. |
| 6,015,198 A | 1/2000 | Stair |
| 6,135,549 A * | 10/2000 | Demick et al. ........... 108/44 X |

\* cited by examiner

Primary Examiner—Jose V. Chen
Assistant Examiner—Michael J. Fisher
(74) Attorney, Agent, or Firm—Stephen R. Greiner

(57) ABSTRACT

A laptop workstation including a cabinet and a swing arm fastened at its inner end for pivotal motion about a vertical axis to the top of the cabinet. The outer end of the swing arm overhangs the top of the cabinet. A turntable is fastened for pivotal motion about a vertical axis to the outer end of the swing arm.

9 Claims, 2 Drawing Sheets

LAPTOP WORKSTATION

FIELD OF THE INVENTION

The present invention relates generally to horizontally supported planar surfaces and, in particular, to such surfaces installed in vehicles and rotatable about a vertical axis.

BACKGROUND OF THE INVENTION

Size, weight, and cost reductions have all contributed to an increased use of portable computers in vehicles. It is well known that salesmen, truck drivers, and others who spend large portions of their workdays in vehicles carry with them portable, laptop computers for access to large amounts of information helpful in performing their jobs. The performance efficiencies of such individuals are greatly improved.

Unhappily, the seats of most vehicles are not configured to serve as tables and laptop computers placed thereon tend to slide around on their sloping surfaces. To avoid this problem, the laptop computer is sometimes placed on the lap of a user, but operating the computer in the confines of a vehicle can prove tricky and uncomfortable. Some have proposed special stands for supporting a computer in a vehicle adjacent a user. Drawbacks in these stands (limited adjustability, minimal storage space, and high cost) are believed to have restricted their commercial success.

SUMMARY OF THE INVENTION

In light of the problems associated with the known methods and apparatus for supporting a laptop computer in a vehicle, it is a principal object of the invention to provide a workstation that adjustably supports a laptop computer and selected work materials like a clipboard or notebook above the seat of a vehicle for ready and comfortable access by a user.

It is another object of the invention to provide a workstation of the type described that has ample, internal storage space for files, writing implements, books, supplies and a laptop computer when not in use.

It is a further object of the invention to provide a laptop workstation that may be releasably secured within a vehicle by means of a conventional seat belt. Thus, the workstation, is portable and may be transferred by a user from one vehicle to another.

Still another object of the invention is to provide a laptop workstation that can be easily leveled when positioned upon a sloping surface like the top of an automobile seat to provide a horizontal work surface for a user. The workstation can, therefore, be adjusted to compensate for sloping terrain upon which a vehicle may rest.

It is an object of the invention to provide improved elements and arrangements thereof in a laptop workstation for the purposes described which is lightweight in construction, inexpensive b manufacture, and dependable in use.

Briefly, the laptop workstation in accordance with this invention achieves the intended objects by featuring a cabinet having a drawer that can be drawn therefrom. A swing arm is pivotally fastened at its inner end to the top of the cabinet. A turntable is pivotally fastened to the outer end of the swing arm. A U-shaped prop is fastened to the cabinet for leveling such. A clipboard bracket is fastened to the swing arm remote from the turntable. At least one pair of fingers is affixed to the top of the cabinet that serve as seat belt guides. The fingers have a height that will not impede the pivoting of the swing arm.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
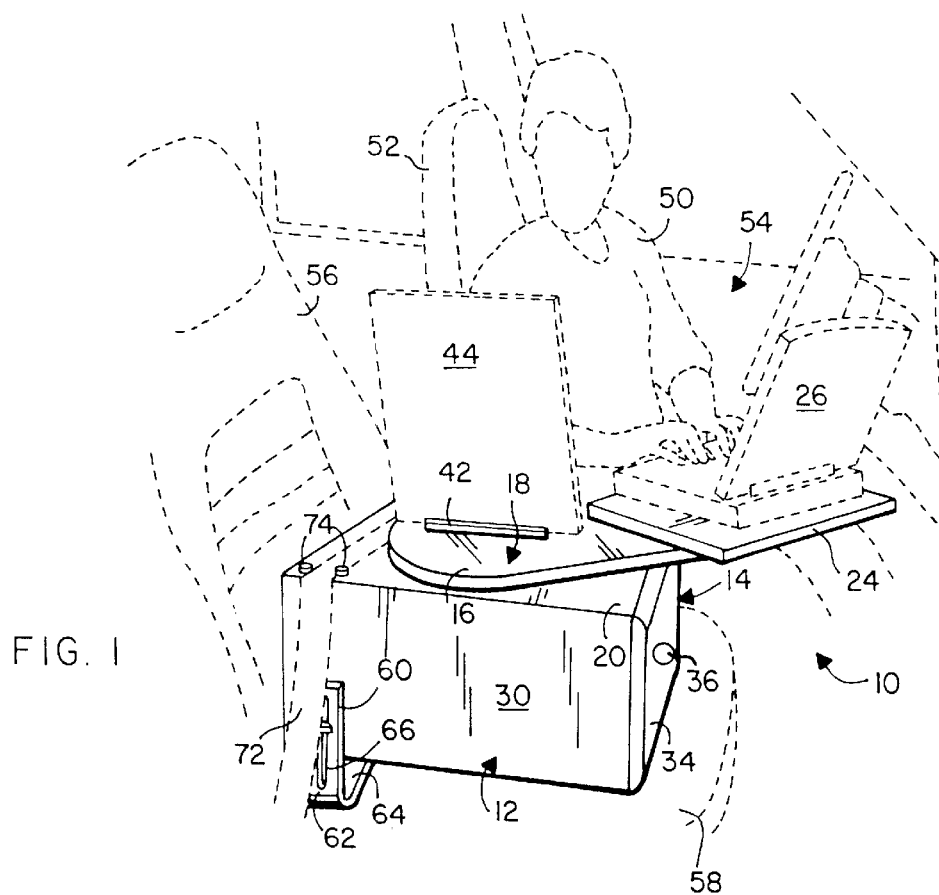
FIG. 1 is an environmental perspective view of a laptop workstation in accordance with the present invention.
Figure 2:
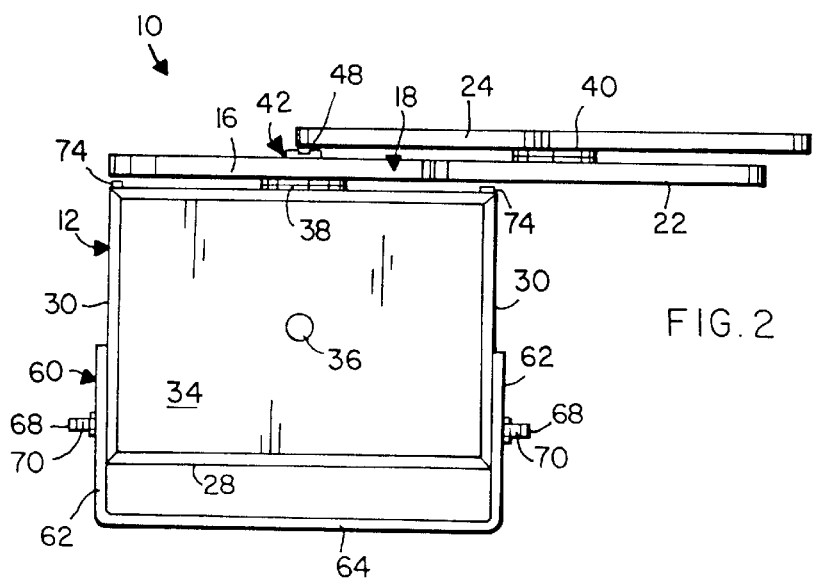
FIG. 2 is a front view of the laptop workstation of FIG. 1.

Referring now to the FIGS., a laptop workstation in accordance with the present invention is shown at 10. Workstation 10 includes a cabinet 12 having a drawer 14 that may be drawn from the front thereof. The inner end 16 of a swing arm 18 is pivotally fastened to the top wall 20 of cabinet 16. The outer end 22 of swing arm 18 overhangs the cabinet 12. A turntable 24 is pivotally fastened to outer end 22 of swing arm 18 for supporting a laptop computer 26.

Cabinet 12 is a rectangular box having opposed top and bottom walls 20 and 28 connected together by opposed side walls 30. A back wall 32 fastened at its periphery to walls 20, 28 and 30 closes the back of cabinet 12. The front plate 34 of drawer 14 selectively closes the open front of cabinet 12.

Drawer 14 is a sliding, open-topped box in cabinet 12. Drawer 14 can be drawn out and then inserted back into the front of cabinet 12 by pushing and pulling on a knob 36 projecting forwardly from front plate 34. Drawer 14 has a large capacity, with dimensions that correspond closely to the interior dimensions of cabinet 12.

Swing arm 18 is fastened by means of a swivel bearing 38 to top wall 20 of cabinet 12. Preferably, swivel bearing 38 is positioned in the center of top wall 20 and serves to anchor swing arm 18 in the manner of a cantilever wherein about one-half of the length of swing arm 18 can be projected from top wall 20. Rotation of swing arm 18 three hundred and sixty degrees about the central axis of swivel bearing 38 is provided.

Turntable .24 is fastened at its center by a swivel bearing 40 to swing arm 18. As shown, turntable 24 is a platform of rectangular outline dimensioned to support laptop computer 26 and whose length and width are about one-half that of the length of swing arm 18. Swivel bearing 40 is fastened to swing arm 18 at a point where, despite the angular orientation of turntable 24, about one-half of swing arm 18 remains free and clear of turntable 24 to serve as a work surface.

Swing arm 18 has a width substantially equal to that of top wall 20 thus providing an ample work surface at its inner end 16. A clipboard bracket 42 for supporting a clipboard 44 or other rigid thing like a three-ring binder is provided atop swing arm 18 at inner end 16. Clipboard bracket 44 comprises an elongated bar 46 with a longitudinal slot 48 whose opposed side walls may be inclined at an acute angle, say thirty degrees, from vertical. Bar 46 is fastened to swing arm 18 at an angle of about thirty degrees to the longitudinal axis of swing arm 18 so that printed materials (not shown) on clipboard 44 may be more readily seen by a user 50 as positioned in FIG. 1 seated in the driver's seat 52 of a parked land vehicle 54.

To retain workstation 10 in a horizontal orientation on passenger seat 56 with its rearwardly sloping top surface 58, cabinet 12 has a U-shaped prop 60. Prop 60 has a pair of opposed legs 62 positioned against side walls 30 and connected at their bottoms by a crosspiece 64. Legs 62 are provided with longitudinal guide slots 66 that receive threaded retaining rods 68 affixed to and extending from the rear ends of side walls 30. Wing nuts 70 threadably engaged with retaining rods 68 affix prop 60 to cabinet 12 and permit the orientation of prop 60 relative to cabinet 12 to be selectively adjusted.

A seat belt 72 may be used to hold workstation 10 on seat 56. Seat belt 72 is simply extended over cabinet 12, made snug and buckled in place. To prevent seat belt 72 from sliding from cabinet 12, a pair of spaced-apart fingers 74 is affixed to each side of top wall 20 adjacent to the rear end thereof. Fingers 74 are spaced from one another at a distance capable of snugly receiving seat belt 72 therebetween. Fingers 74 preferably have a height that will not impede the motion of swing arm 18 on swivel bearing 38.

Figure 3:
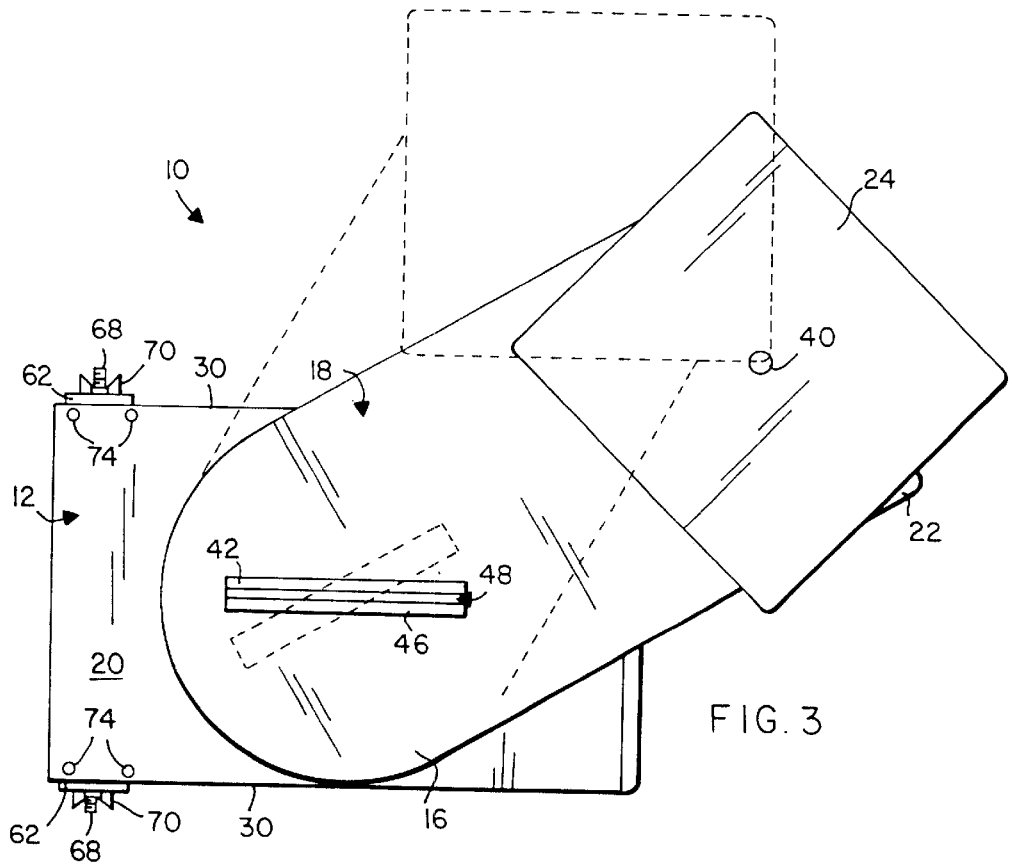
FIG. 3 is a top view of the laptop workstation.
Figure 4:
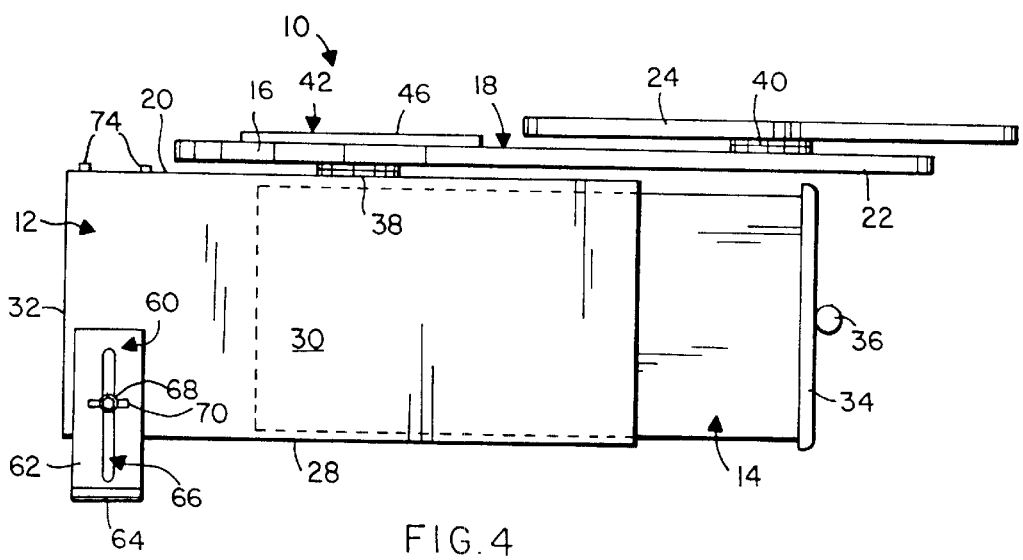
FIG. 4 is a side view of the laptop workstation.

Use of workstation 10 is straightforward. First, cabinet 12 is positioned on seat top 58. Then, by loosening and tightening wing nuts 70 and manipulating prop 60, cabinet 12 is made level. Next, seat belt 72 is run over cabinet 12, between fingers 74, and snugged to lock workstation 10 upon seat 56. If laptop computer 26 and clipboard 44 are stored in drawer 14, such are removed and positioned, respectively, on turntable 24 and within slot 48 of clipboard bracket 42. Swing arm 18 and turntable 24 may now be rotated to any convenient location, perhaps from the solid line position of FIG. 3 to the broken line position for greatest comfort. User 50 may now access information on clipboard 44 and within laptop computer 26.

While the invention has been described with a high degree of particularity, it will be appreciated by those skilled in the art that modifications may be made thereto. For example, hook and loop fasteners may be employed to prevent laptop computer 26 from sliding from turntable 24. Therefore, it is to be understood that the present invention is not limited to the sole embodiment described above, but encompasses any and all embodiments within the scope of the following claims.

I claim:

1. A laptop: workstation, comprising:
   a cabinet;
   a swing arm having an inner end and an outer end, said inner end being fastened for pivotal motion about a vertical axis to the top of said cabinet, and said outer end overhanging the top of said cabinet; and,
   a turntable fastened for pivotal motion about a vertical axis to said outer end of said swing arm.

2. The laptop workstation according to claim 1 wherein said cabinet has a drawer that can be drawn from the front thereof.

3. The laptop workstation according to claim 1 further comprising a clipboard bracket, said clipboard bracket including an elongated bar fastened to said inner end of said swing arm, and said elongated bar having a longitudinal slot therein for receiving the bottom of a clipboard.

4. The laptop workstation according to claim 1 further comprising:
   a U-shaped prop for leveling said cabinet, said prop including:
      a pair of legs positioned against the opposed sides of said cabinet, each of said legs having a longitudinal guide slot therein; and,
      a crosspiece connecting the bottoms of said legs together and positioned beneath said cabinet;
   a pair of threaded retaining rods extending from the opposite sides of said cabinet and through said longitudinal guide slots in said legs; and,
   a pair of wing nuts each being threadably engaged with one of said retaining rods so as to selectively affix said prop to said cabinet.

5. The laptop workstation according to claim 1 further comprising at least one pair of fingers affixed to the top of said cabinet, said fingers being spaced from one another at a distance capable of snugly receiving a seat belt therebetween, and said fingers having a height that will not impede the pivoting motion of said swing arm.

6. A laptop workstation, comprising:
   a cabinet having a drawer that can be drawn therefrom;
   a swing arm having an inner end and an outer end, said inner end being fastened for pivotal motion about a vertical axis to the top of said cabinet, and said outer end overhanging the top of said cabinet;
   a turntable fastened for pivotal motion about a vertical axis to said outer end of said swing arm;
   a U-shaped prop for leveling said cabinet, said prop including:
      a pair of legs positioned against the opposed sides of said cabinet, each of said legs having a longitudinal guide slot therein; and,
      a crosspiece connecting the bottoms of said legs together and positioned beneath said cabinet;
   a pair of threaded retaining rods extending from the opposite sides of said cabinet and through said longitudinal guide slots in said legs; and,
   a pair of nuts each being threadably engaged with one of said retaining rods so as to selectively affix said prop to said cabinet.

7. The laptop workstation according to claim 6 further comprising a clipboard bracket, said clipboard bracket including an elongated bar fastened to said inner end of said swing arm, and said elongated bar having a longitudinal slot therein.

8. The laptop workstation according to claim 6 further comprising at least one pair of fingers affixed to the top of said cabinet, said fingers being spaced from one another at a distance capable of snugly receiving a seat belt therebetween, and said fingers having a height that will not impede the pivoting motion of said swing arm.

9. A laptop workstation, comprising:
   a cabinet having a drawer that can be drawn therefrom;
   a swing arm having an inner end and an outer end, said inner end being fastened for pivotal motion about a vertical axis to the top of said cabinet, and about one-half of the length of said swing arm being selectively projected from the top of said cabinet;
   a turntable fastened for pivotal motion about a vertical axis to said outer end of said swing arm;
   a U-shaped prop for leveling said cabinet, said prop including:
      a pair of legs positioned against the opposed sides of said cabinet, each of said legs having a longitudinal guide slot therein; and,
      a crosspiece connecting the bottoms of said legs together and positioned beneath said cabinet;

a pair of threaded retaining rods extending from the opposite sides of said cabinet and through said longitudinal guide slots in said legs;

a pair of nuts each being threadably engaged with one of said retaining rods so as to selectively affix said prop to said cabinet;

a clipboard bracket including an elongated bar fastened to said inner end of said swing arm; and at least one pair of fingers affixed to the top of said cabinet, said fingers being spaced from one another at a distance capable of snugly receiving a seat belt therebetween, and said fingers having a height that will not impede the pivoting of said swing arm.

\* \* \* \* \*